June 23, 1959 — A. N. STANTON — 2,891,400

FLUID DENSITY TRANSDUCERS

Filed Feb. 18, 1955

INVENTOR
Austin N. Stanton
BY *Wm. T. Wofford*
ATTORNEY

United States Patent Office 2,891,400
Patented June 23, 1959

2,891,400

FLUID DENSITY TRANSDUCERS

Austin N. Stanton, Garland, Tex.

Application February 18, 1955, Serial No. 489,032

3 Claims. (Cl. 73—182)

My invention relates to transducers, and more particularly to transducers of a type capable of measuring the relative densities of two separated bodies of gas and deriving electrical signal outputs from which various density relationships can be determined and utilized.

It is desirable for various applications to determine one or more of the ratio, product, sum, and difference of the densities of two separated bodies of gas. Currently available devices for accomplishing the foregoing are of complex mechanical nature characterized by lack of optimum ruggedness, high maintenance, high first cost, and undesirable bulk. Also, in currently available devices, the maximum non-damaging density differential is too limited for some important applications.

Accordingly, it is an object of my invention to provide a transducer capable of measuring relative densities of two separated bodies of gas which will not involve complex mechanical structure, or the disadvantages attending same.

Another object of my invention is to provide a transducer which will derive electrical signal outputs from which one or more of the ratio, product, sum, or difference of the densities of two separated bodies of gas may be determined.

Another object of my invention is to provide a transducer capable of measuring relative densities of two separated bodies of gas and which shall have essentially no moving parts, and which consequently shall require little or no maintenance.

Another object of my invention is to provide a transducer capable of measuring relative densities of two separated bodies of gas and which is capable of withstanding very large gaseous medium pressure differentials and is consequently effective over a wide range of operation.

Another object of my invention is to provide a transducer capable of measuring the relative densities of two separated bodies of gas which has a lower first cost and which shall be less bulk than prior art devices for the same purpose.

Figure 1:
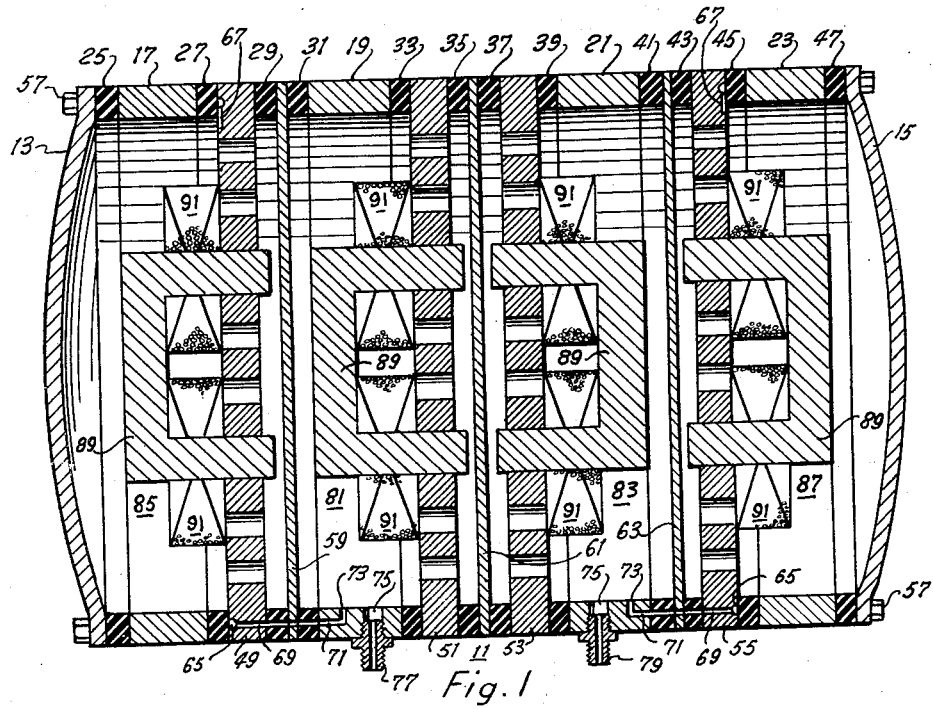
Figure 2:
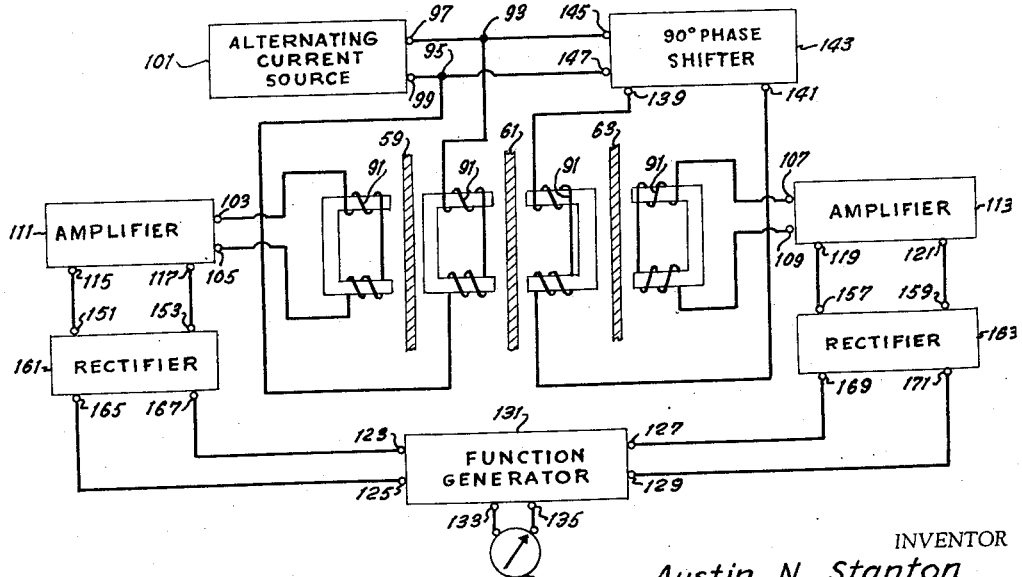

These and other objects are effected by my invention as will be apparent from the following description taken in accordance with the accompanying drawing, forming a part of this application, in which:

Figure 1 is a schematic longitudinal section view showing the mechanical structure of the signal generating portion of the transducer of my invention; and, Figure 2 is a schematic circuit diagram of the transducer of my invention.

My invention makes use of the proposition that sound energy near the surface of a vibrating diaphragm may be expressed as:

$$E = \frac{df^2a^2c}{2}$$

where $d$ is the density of the gaseous medium through which the sound energy passes, $a$ is the amplitude, $f$ is the frequency, and $c$ the velocity of sound in the medium, $c$ being independent of the density of the medium.

In accordance with my invention, a driven diaphragm in a closed chamber is vibrated by electric driving means, causing sound energy to be radiated in both directions perpendicular to the diaphragm. Two gaseous mediums, the relative densities of which are to be determined are introduced into the closed chamber, one on each side of the driven diaphragm. Now the sound energy propagated on each side of the driven diaphragm will be proportional to the density of the medium on its respective side. Identical electrical pick-ups, each comprising a ferromagnetic diaphragm and associated pick-up coils, are symmetrically placed on each side of the driven diaphragm. These electrical pick-ups will then produce output voltages whose amplitudes are proportional to the respective gaseous medium densities only, as shown by the above equation.

Turning now to the drawings for a more detailed description and explanation of my invention, there is shown in Figure 1 an enclosed chamber 11 of generally cylindrical shape, made up of a pair of end closures 13, 15, a plurality of spacer rings 17, 19, 21, 23, gasket rings 25—47, and coil assembly support rings 49, 51, 53, 55. All of the parts just mentioned each have a plurality of axially extending equally spaced holes (not shown) adjacent their peripheral edges through which clamping bolts 57 are passed to make a unitary gas-tight assembly. As seen in Figure 1 the order of clamped parts from left to right is end closure member 13, gasket ring 25, spacer ring 17, gasket ring 27, coil assembly support ring 49, gasket ring 29, pick-up diaphragm 59, gasket ring 31, spacer ring 19, gasket ring 33, coil assembly support ring 51, gasket ring 35, driven diaphragm 61, gasket ring 37, coil assembly support ring 53, gasket ring 39, spacer ring 21, gasket ring 41, pick-up diaphragm 63, gasket ring 43, coil assembly support ring 55, gasket ring 45, spacer ring 23, gasket ring 47, end closure member 15. The end closure members 13, 15 present slightly convex outer surfaces, in order to enhance the rigidity of the enclosure 11. The gasket rings 24—47 are all identical, and may be made of any suitable material. Neoprene rubber, for example, would be satisfactory. The end closure members, spacer rings, and coil assembly support rings are shown as being metal, but these could of course be made of non-metallic material having suitable structural characteristics. The coil assembly support rings 49—55 are actually flat discs having suitable openings therein for receiving the core legs of the associated coil assembly, and provided with numerous perforations so as to present a very low acoustic impedance. Various types of web-like structures could serve as a coil assembly support rings providing they possessed the requisite rigidity and low acoustic impedance. The coil assembly support rings 49—55 are all identical except that those associated with the pick-up coil assemblies are provided with an annular groove 65 cut half way around near the inner edge of the outer face. These grooves 65 in each case form a part of a high acoustic impedance passage around the pick-up diaphragm 59, 63, so that gas pressure on either side of the diaphragm will be equalized without interference with the acoustic characteristics of the chamber 11. At one end of the groove 65 there is a short channel 67 disposed radially inward of the groove allowing communication from the groove to that portion of the enclosure on the outside of the pick-up diaphragm 59, 63. The high acoustic impedance passage is completed via an axially disposed hole 69 in the support ring 49, 55 at the other end of the groove 65, axially disposed and aligned holes in the pick-up diaphragm and its associated ring gaskets and a further axially disposed and aligned hole 71 extending a short distance into a spacer ring 19, 21 and communicating with a radially disposed hole 73 leading to the enclosure 11 on the inside of the pick-up diaphragm. Other forms of satisfactory high acoustic impedance passages will occur to those skilled in the art. For example, it may be desirable to extend the groove through a full circle, or to place it elsewhere. The spacer rings 17—23 are all identical except that those adjacent opposite sides of the driven diaphragm 61 are provided with openings 75 adapted to receive fittings 77, 79 terminating lines leading to the sources of the two gaseous mediums the relative densities of which are to be determined.

There are provided a pair of driving coil assemblies 81, 83, one on each side of the driven diaphragm 61, and a pair of pick-up coil assemblies 85, 87, one located on the outward side of each pick-up diaphragm 59, 63. Each coil assembly comprises a U shaped core member 89 having a coil 91 on each of its outer legs. Sufficient free space is provided at the outer ends of the core legs to enable insertion through the mounting holes in the coil assembly support rings. The core legs may be fixed or locked to the support rings by any suitable means (not shown). The end faces of the core legs are arranged parallel to, symmetrically disposed with relation to the center of, and slightly spaced from, the associated diaphragm. The diaphragms 59, 61, 63, which are made of ferromagnetic material, serve in the nature of armatures as part of the magnetic circuit of their respective coil assemblies 85, 81, 83, 87. The pick-up diaphragms 59, 63 are thin and flexible and are spaced a minimum distance from the driven diaphragm 61. The driver diaphragm is capable of withstanding very large gaseous medium pressure differentials and has a stiffness (thickness) sufficient that its deflection, even under conditions of large pressure differences will not appreciably affect its central position. The driving coils are effective to vibrate the driven diaphragm even though it is quite stiff.

Referring now to the schematic circuit diagram of Fig. 2, it is seen that the two coils 91 of each coil assembly 81—87 are serially connected. The input terminals 93, 95 of the left hand driving coil assembly 81 are connected directly to the output terminals 97, 99 of an alternating current source. The alternating current source, shown as a block 101, may be of a conventional type providing ample power for effective vibration of the driven diaphragm 61. The input terminals 139, 141, of the right hand driving coil assembly 87 are connected to the output terminals of a 90° phase shifting device 143, which in turn has its input terminals 145, 147 connected to the output terminals of the alternating current source 101. The phase shifting device may be of a conventional type, and is shown as a block 143. The output terminals of the pick-up coils are connected to input terminals 103, 105, 107, 109 of respective amplifiers 111, 113. The amplifiers, shown as blocks 111, 113 are identical, and may be of a conventional electronic type for amplifying periodic voltages. The output terminals 115, 117, 119, 121 of each amplifier are connected to respective input terminals 151, 153, 157, 159 of a rectifier 161, 163, the respective output terminals 165, 167, 169, 171 of which are connected to respective input terminals 123, 125, 127, 129 of a device termed a function generator, shown as a block 131. The rectifiers 161, 163, are identifical and may be of any conventional type suitable for rectifying periodic voltages, and are shown as blocks. The composition of the function generator 131 is dependent upon which of the difference, ratio, sum, product relationships of the densities of the gaseous mediums it is desired to determine, as will be more apparent from the description of operation below. Output terminals 133, 135 of the function generator are connected to an indicator device 137.

The transducer of my invention is particularly useful as an air speed indicator, especially for aircraft capable of supersonic speeds. The operation of the transducer will accordingly be described in connection with its use as an air speed indicator. For this use, static air is fed into one-half, for example the left half, of the enclosed chamber via the inlet fitting 77, and dynamic (impact) air is fed to the right half of the chamber via the inlet fitting 79. The alternating current source 101 may then be the aircraft alternating current power supply system, usually 24 volts at 400 c.p.s. Vibration of the driven diaphragm then generates sound energy which is radiated in both directions perpendicular to the driven diaphragm. As hereinbefore stated, the sound energy propagated on each side of the driven diaphragm will be proportional to the density of the air on its respective side. Accordingly, the relative magnitudes of the vibrations of the pick-up diaphragms due to the sound energy propagated through the respective mediums, will be likewise proportional to the respective air densities. Vibration of the pick-up diaphragms causes periodic voltages to be induced in the coils of the pick-up coil assemblies which voltages vary in magnitude in accordance with the sound energy transmitted through the air on each side of the driven diaphragm. The relative magnitudes of these induced voltages will also be proportional to respective densities of the static and dynamic air. These induced voltages are then fed to the respective amplifiers 111, 113, the outputs of which are in turn fed through rectifiers 161, 163, to the function generator 131. Since it is desired in this case to measure air speed, which is a pressure differential relationship, the function generator need only be a device capable of producing an output voltage the magnitude of which represents the difference in the magnitudes of the periodic input voltages. A properly calibrated voltage actuated indicator 137, when fed by this difference voltage will then read indicated air speed. It is recognized that certain corrections required by other variables may have to be added. When other density relationships such as ratio, sum, product, are desired, the function generator is revised accordingly. Circuit arrangements and devices for obtaining the ratio, sum, or product of input voltages are well known in the art and are therefore not described herein specifically. By suitable arrangement of function generator and indicators, it is of course possible to derive and indicate a plurality of density relationships simultaneously.

The purpose of the 90° phase shifter 143, is to provide flux relationships in the magnetic circuits of the drive coil assemblies 81, 83 such that the resultant flux will cause alternate right and left pulling forces to be exerted on the driven diaphragm 61. With the arrangement shown, the vibration frequency of the driven diaphragm 61 will be twice the output frequency of the alternating current source 101. Also, in the embodiment shown and described, the cores of the pick-up coil assemblies 85, 87 are permanent magnets preferably of material such as that known to the trade as Alnico, so that movement of the ferromagnetic pick-up diaphragms in the fields of the permanent magnets will cause voltages to be induced in the pick-up coils 91. The cores of the drive coil assemblies 81, 83 are not permanent magnets. If it is desired to use permanent magnet cores in the drive coil assemblies then the phase shift required, if any, will depend on the orientation of the magnets. Further, there may be some phase shift in the sound energy during propagation from the driven diaphragm to the pick-up coils, and it is recognized that the magnitude of this phase shift as well as phase differences of sound energy arriving at the pick-up coils may provide useful indications.

The coil assembly cores are shown in the drawing as being all arranged with their sides parallel to a single plane. In practice it may be preferable to dispose the cores so that they are still symmetrical with respect to a central axis but with the sides of the drive coil assembly cores parallel to perpendicular planes, and with the sides of the pick-up coil assembly cores rotated 90° with respect to the sides of the respective adjacent drive coil assembly cores. This arrangement will serve to better isolate the individual cores and minimize interference which could be caused by mutual inductance action.

The dimensions of the enclosed chamber and the diagrams, and the frequency of the alternating current source should all be chosen to avoid resonance of the parts, because of the sensitivity of resonant systems to temperature variations.

It will be apparent from the foregoing that I have provided an improved transducer capable of measuring various density relationships of two separated bodies of gas which is susceptible to lightweight compact construction; which does not involve complex mechanical structure or movements; which essentially has no moving parts; and which is capable of withstanding very large gaseous medium pressure differentials, and is consequently effective over a wide range of operation.

While I have shown my invention in only one form, it will be obvious to those skilled in the art that it is not so limited, but is susceptible of various changes and modifications without departing from the spirit thereof.

I claim:

1. An air speed indicator device comprised of means defining an enclosed chamber; a driven diaphragm, a pair of pick-up diaphragms disposed on opposite sides of the said driven diaphragm, the said diaphragms located and positioned so that the said diaphragms separate the chamber defined by said first mentioned means into a plurality of compartments; means for introducing static air into one of said compartments which is defined between one side of said driven diaphragm and one of said pick-up diaphragms; means for introducing impact air into one of said compartments which is defined between the other side of said driven diaphragm and the other of said pick-up diaphragms; means for driving said driven diaphragm whereby each of the said pick-up diaphragms will be caused to vibrate at an amplitude proportional to the density of the air present on the respective sides of the driven diaphragm; electromagnetic means adjacent to each of said pick-up diaphragms and responsive to the vibrations of each of the said pick-up diaphragms for deriving a periodic voltages having an amplitude proportional to the amplitude of vibration of the respective pick-up diaphragms; means including a rectifier means operably connected to said electromagnetic means and responsive to said voltages to produce an output signal proportional to the amplitude difference between said voltages; and an indicator device operably connected to receive the output signal of said last mentioned means.

2. A transducer comprising means defining an enclosed chamber; a driven diaphragm, a pair of pick-up diaphragms disposed on opposite sides of the said driven diaphragm, the said diaphragm located and positioned so that the said diaphragms separate the chamber defined by said first mentioned means into a plurality of compartments; means for introducing a fluid medium of one density into one of said compartments which is defined between one side of said driven diaphragm and one of said pick-up diaphragms; means for introducing a fluid medium of another density into one of said compartments which is defined between the other side of said driven diaphragm and the other of said pick-up diaphragms; means for driving said driven diaphragm whereby each of the said pick-up diaphragms will be caused to vibrate at an amplitude proportional to the density of the said fluid medium present on the respective sides of the driven diaphragm; high acoustic impedance passages connecting the adjacent compartments on either side of each pick-up diaphragm to equalize the pressure of the said medium on the respective sides of the said pick-up diaphragms; and means responsive to each pick-up diaphragm for deriving an output signal which is proportional to the vibration of the respective pick-up diaphragms.

3. A transducer comprising means defining an enclosed chamber; a driven ferro-magnetic diaphragm, a pair of pick-up ferro-magnetic diaphragms disposed on opposite sides of the said driven diaphragm, the said diaphragms located and positioned so that the said diaphragms separate the chamber defined by said first mentioned means into a plurality of compartments; means for introducing a fluid medium of one density into one of said compartments which is defined between one side of said driven diaphragm and one of said pick-up diaphragms; means for introducing a fluid medium of another density into one of said compartments which is defined between the other side of said driven diaphragm and the other of said pick-up diaphragms; electrical coil means for driving said driven diaphragm whereby each of the said pick-up diaphragms will be caused to vibrate at an amplitude proportional to the density of the air present on the respective sides of the driven diaphragm; electromagnetic means adjacent to each of said pick-up diaphragms and responsive to the vibrations of each of the said pick-up diaphragms for deriving a periodic voltages having an amplitude proportional to the amplitude of vibration of the respective pick-up diaphragms; and high acoustic impedance passages connecting the adjacent compartments on either side of each pick-up diaphragm to equalize the pressure of the said medium on the respective sides of the said pick-up diaphragms.

References Cited in the file of this patent

UNITED STATES PATENTS

| | | |
|---|---|---|
| 1,528,586 | Tate | Mar. 3, 1925 |
| 1,570,781 | Ruben | Jan. 26, 1926 |
| 2,480,646 | Grabau | Aug. 30, 1949 |
| 2,568,277 | Eltgroth | Sept. 18, 1951 |
| 2,800,796 | Westcott et al. | July 30, 1957 |

FOREIGN PATENTS

| | | |
|---|---|---|
| 520,484 | Germany | Mar. 23, 1931 |
| 825,177 | Germany | Dec. 17, 1951 |
| 727,891 | Great Britain | Apr. 13, 1955 |